United States Patent
Saravanapriyan et al.

(10) Patent No.: US 10,088,839 B2
(45) Date of Patent: Oct. 2, 2018

(54) METHOD AND SYSTEM FOR REAL-TIME PERFORMANCE DEGRADATION ADVISORY FOR CENTRIFUGAL COMPRESSORS

(71) Applicant: Nuovo Pignone SRL, Florence (IT)

(72) Inventors: Arul Saravanapriyan, Doha (QA);
Pier Luigi Di Pillo, Florence (IT);
Osama Naim Ashour, Doha (QA);
Giuseppe Stringano, Florence (IT);
Abdurrahman Abdallah Khalidi, Doha (QA)

(73) Assignee: Nuovo Pignone Srl, Florence (IT)

( * ) Notice: Subject to any disclaimer, the term of this patent is extended or adjusted under 35 U.S.C. 154(b) by 1066 days.

(21) Appl. No.: 14/382,063

(22) PCT Filed: Mar. 1, 2013

(86) PCT No.: PCT/EP2013/054158
§ 371 (c)(1),
(2) Date: Aug. 29, 2014

(87) PCT Pub. No.: WO2013/127996
PCT Pub. Date: Sep. 6, 2013

(65) Prior Publication Data
US 2015/0057973 A1    Feb. 26, 2015

(30) Foreign Application Priority Data
Mar. 1, 2012   (IT) .............. CO2012A0008

(51) Int. Cl.
*G05B 17/02*   (2006.01)
*G05B 23/02*   (2006.01)
(Continued)

(52) U.S. Cl.
CPC ....... *G05B 23/0245* (2013.01); *F01D 21/003* (2013.01); *F02C 7/00* (2013.01);
(Continued)

(58) Field of Classification Search
CPC ............... G05B 23/0283; G05B 11/06; G05B 23/0245; G05B 2219/31457; G05B 23/0235
See application file for complete search history.

(56) References Cited

U.S. PATENT DOCUMENTS

| | | |
|---|---|---|
| 3,898,439 A | 8/1975 | Reed et al. |
| 4,249,238 A | 2/1981 | Spang, III et al. |

(Continued)

FOREIGN PATENT DOCUMENTS

| | | |
|---|---|---|
| CN | 1494670 A | 5/2004 |
| CN | 1621671 A | 6/2005 |

(Continued)

OTHER PUBLICATIONS

Gulen et al., "Real-Time On-Line Performance Diagnostics of Heavy-Duty Industrial Gas Turbines", Presented at the International Gas Turbine & Aeroengine Congress & Exhibition Munich, Germany—May 8-11, 2000, http://www.thermoflow.com/VirtualTours/ASME_2000-GT-312_ThermoflowGTEYE.pdf.*

(Continued)

*Primary Examiner* — Huan Tran
(74) *Attorney, Agent, or Firm* — GE Global Patent Operation

(57) ABSTRACT

A system and computer-implemented method for generating real-time performance advisories for a centrifugal compressor of a fleet of centrifugal compressors are provided. The method includes receiving an actual thermodynamic signature of the compressor, that is unique to the compressor, receiving compressor process parameter values during operation of the compressor, determining, in real-time, an actual performance of the compressor using the compressor process parameter values, determining, in real-time, a predicted performance of the compressor using the received actual thermodynamic signature of the compressor, determining a performance deviation of the compressor using the (Continued)

actual performance and the predicted performance, comparing the performance deviation to a predetermined dynamic threshold range of performance deviation specific to operating speed, and generating a notification to a user using the comparison.

20 Claims, 6 Drawing Sheets

(51) Int. Cl.
  *G05B 11/06* (2006.01)
  *F02C 7/00* (2006.01)
  *G01M 15/14* (2006.01)
  *H04L 29/08* (2006.01)
  *F04B 51/00* (2006.01)
  *G01L 3/10* (2006.01)
  *F01D 21/00* (2006.01)
  *G01K 13/00* (2006.01)

(52) U.S. Cl.
  CPC ............ *F04B 51/00* (2013.01); *G01K 13/00* (2013.01); *G01L 3/10* (2013.01); *G01M 15/14* (2013.01); *G05B 11/06* (2013.01); *G05B 23/0216* (2013.01); *G05B 23/0218* (2013.01); *G05B 23/0283* (2013.01); *H04L 67/10* (2013.01); *F05D 2260/80* (2013.01)

(56) References Cited

U.S. PATENT DOCUMENTS

| | | |
|---|---|---|
| 4,449,358 A | 5/1984 | Mani |
| 4,969,796 A | 11/1990 | Wescott et al. |
| 5,271,215 A | 12/1993 | Guillet |
| 5,761,895 A | 6/1998 | Chu et al. |
| 5,806,299 A | 9/1998 | Bauermeister et al. |
| 6,209,310 B1 | 4/2001 | Kuenzi et al. |
| 6,338,240 B1 | 1/2002 | Endo et al. |
| 6,460,346 B1 | 10/2002 | Cleary |
| 6,530,207 B2 | 3/2003 | Tobo et al. |
| 6,591,182 B1* | 7/2003 | Cece ............... F02C 9/00 477/30 |
| 6,658,091 B1 | 12/2003 | Naidoo et al. |
| 6,795,798 B2 | 9/2004 | Eryurek et al. |
| 7,254,491 B2 | 8/2007 | Mylaraswamy et al. |
| 7,398,182 B2 | 7/2008 | Petit |
| 7,702,447 B2 | 4/2010 | Volponi |
| 7,831,704 B2 | 11/2010 | Schachtely et al. |
| 8,165,723 B2* | 4/2012 | Nasle ............... G05B 17/02 700/21 |
| 8,818,684 B2 | 8/2014 | John et al. |
| 2002/0013664 A1 | 1/2002 | Strackeljan et al. |
| 2002/0193933 A1 | 12/2002 | Adibhatla et al. |
| 2003/0041135 A1 | 2/2003 | Keyes et al. |
| 2003/0053906 A1 | 3/2003 | Itou et al. |
| 2003/0055534 A1 | 3/2003 | Saito et al. |
| 2003/0061879 A1 | 4/2003 | Otsuka |
| 2004/0011056 A1 | 1/2004 | Yee et al. |
| 2004/0024568 A1 | 2/2004 | Eryurek et al. |
| 2004/0148129 A1 | 7/2004 | Gotoh et al. |
| 2004/0148940 A1 | 8/2004 | Venkateswaran et al. |
| 2005/0033481 A1 | 2/2005 | Budhraja et al. |
| 2005/0096759 A1 | 5/2005 | Benjamin, IV et al. |
| 2005/0240289 A1 | 10/2005 | Hoyte et al. |
| 2006/0025961 A1 | 2/2006 | Appel et al. |
| 2006/0031187 A1 | 2/2006 | Pyrce et al. |
| 2006/0116847 A1 | 6/2006 | Plotts et al. |
| 2006/0241910 A1 | 10/2006 | Petchenev et al. |
| 2007/0056387 A1 | 3/2007 | Obikawa |
| 2007/0104306 A1 | 5/2007 | Umezawa et al. |
| 2007/0118270 A1 | 5/2007 | Wiseman et al. |
| 2007/0186557 A1 | 8/2007 | Gallagher et al. |
| 2007/0203669 A1 | 8/2007 | Hayashi |
| 2007/0234730 A1 | 10/2007 | Markham et al. |
| 2008/0133679 A1 | 6/2008 | Addy |
| 2008/0208429 A1 | 8/2008 | Saravanapriyan et al. |
| 2008/0243352 A1 | 10/2008 | Healy |
| 2009/0043539 A1* | 2/2009 | Frank ............... G05B 23/0221 702/183 |
| 2009/0055105 A1 | 2/2009 | Yoshida et al. |
| 2009/0125206 A1 | 5/2009 | Tisenchek et al. |
| 2009/0149972 A1 | 6/2009 | Nasle |
| 2009/0324389 A1 | 12/2009 | Fischetti et al. |
| 2010/0024536 A1 | 2/2010 | Adibhatla et al. |
| 2010/0080685 A1 | 4/2010 | Morgan et al. |
| 2010/0257410 A1* | 10/2010 | Cottrell ............. G05B 23/0229 714/45 |
| 2010/0257838 A1 | 10/2010 | Mazzaro et al. |
| 2010/0262401 A1 | 10/2010 | Pfeifer et al. |
| 2010/0290889 A1 | 11/2010 | Fedor |
| 2010/0324870 A1 | 12/2010 | Beckman et al. |
| 2011/0062708 A1 | 3/2011 | Prochaska et al. |
| 2011/0112797 A1 | 5/2011 | Nühse et al. |
| 2011/0162386 A1 | 7/2011 | Chandrabose et al. |
| 2011/0178737 A1 | 7/2011 | Hudson et al. |
| 2011/0247406 A1 | 10/2011 | Grosse-Laxzen et al. |
| 2011/0289899 A1 | 12/2011 | De La Cruz Garcia et al. |
| 2012/0016824 A1 | 1/2012 | Kalinkin et al. |
| 2012/0143623 A1 | 6/2012 | Opfer et al. |
| 2012/0150335 A1* | 6/2012 | Prabhu ............. G05B 23/0235 700/110 |
| 2012/0158205 A1* | 6/2012 | Hinman ............ G05B 23/0216 700/297 |
| 2012/0279230 A1 | 11/2012 | Botarelli |
| 2013/0098042 A1 | 4/2013 | Frealle et al. |
| 2013/0103353 A1 | 4/2013 | Kloppner |
| 2015/0025689 A1* | 1/2015 | Saravanapriyan ............ G05B 23/0216 700/275 |
| 2015/0185716 A1* | 7/2015 | Wichmann ........... F01K 23/101 700/287 |

FOREIGN PATENT DOCUMENTS

| | | |
|---|---|---|
| CN | 1690684 A | 11/2005 |
| CN | 1690685 A | 11/2005 |
| CN | 1721275 A | 1/2006 |
| CN | 1892029 A | 1/2007 |
| CN | 101206160 A | 6/2008 |
| CN | 101858826 A | 10/2010 |
| CN | 102027348 A | 4/2011 |
| CN | 102192985 A | 9/2011 |
| CN | 102226428 A | 10/2011 |
| CN | 102252850 A | 11/2011 |
| CN | 102312728 A | 1/2012 |
| DE | 102010026678 A1 | 1/2012 |
| EP | 0198502 A1 | 10/1986 |
| EP | 1556598 B1 | 9/2006 |
| EP | 2138726 A2 | 12/2009 |
| EP | 2345878 A2 | 7/2011 |
| GB | 2085528 A | 4/1982 |
| JP | 4713023 A | 6/1972 |
| JP | 572497 A | 1/1982 |
| JP | 5838329 A | 3/1983 |
| JP | 60142070 A | 7/1985 |
| JP | 60216098 A | 10/1985 |
| JP | 0255807 A | 2/1990 |
| JP | 03155350 A | 7/1991 |
| JP | 476232 A | 3/1992 |
| JP | 0586898 A | 4/1993 |
| JP | 08189846 A | 7/1996 |
| JP | 09166029 A | 6/1997 |
| JP | 2000205563 A | 7/2000 |
| JP | 2002180851 A | 6/2002 |
| JP | 2003090297 A | 3/2003 |
| JP | 2003091313 A | 3/2003 |
| JP | 2003111475 A | 4/2003 |
| JP | 2004501465 A | 1/2004 |
| JP | 2004232643 A | 8/2004 |
| JP | 2004278395 A | 10/2004 |
| JP | 2005502021 A | 1/2005 |

(56) References Cited

FOREIGN PATENT DOCUMENTS

| | | | |
|---|---|---|---|
| JP | 2005135422 A | 5/2005 |
| JP | 2005135430 A | 5/2005 |
| JP | 2005147812 A | 6/2005 |
| JP | 2005195257 A | 7/2005 |
| JP | 2006125275 A | 5/2006 |
| JP | 2006302293 A | 11/2006 |
| JP | 2007138937 A | 6/2007 |
| JP | 2007218254 A | 8/2007 |
| JP | 2007231804 A | 9/2007 |
| JP | 2008097643 A | 4/2008 |
| JP | 2008175149 A | 7/2008 |
| JP | 2009043266 A | 2/2009 |
| JP | 2009047092 A | 3/2009 |
| JP | 2010031842 A | 2/2010 |
| JP | 2010084764 A | 4/2010 |
| JP | 2010265901 A | 11/2010 |
| JP | 2011137448 A | 7/2011 |
| JP | 2011247265 A | 12/2011 |
| JP | 2011256734 A | 12/2011 |
| JP | 2012008782 A | 1/2012 |
| JP | 2012530975 A | 12/2012 |
| JP | 2013512381 A | 4/2013 |
| RU | 2005112459 A | 9/2005 |
| RU | 2005141148 A | 5/2006 |
| RU | 66447 U1 | 9/2007 |
| RU | 2010121150 A | 12/2011 |
| RU | 2010144075 A | 5/2012 |
| WO | 0169329 A2 | 9/2001 |
| WO | 02103177 A1 | 12/2002 |
| WO | 2005041209 A1 | 5/2005 |
| WO | 2005124491 A1 | 12/2005 |
| WO | 2011003688 A1 | 1/2011 |
| WO | 2011073350 A1 | 6/2011 |
| WO | 2011075233 A1 | 6/2011 |

OTHER PUBLICATIONS

Notice of Allowance issued in connection with related U.S. Appl. No. 14/382,036 dated Oct. 21, 2015.
Unofficial English translation of Office Action issued in connection with corresponding CN Application No. 201380011998.9 dated Dec. 25, 2015.
Unofficial English Translation of Chinese Office Action issued in connection with related CN Application No. 201380011941.9 dated Jan. 25, 2016.
Unofficial English Translation of Chinese Office Action issued in connection with related CN Application No. 201380012000.7 dated Feb. 3, 2016.
Unofficial English translation of Office Action issued in connection with related CN Application No. 201380012036.5 dated Feb. 22, 2016.
Hui-Ming, "Analysis and Handling of the Combustion Fault in a S109FA Gas Turbine", Power Equipment, vol. No. 25, Issue No. 5, pp. 331-335, Sep. 2011.
Unofficial English translation of Office Action issued in connection with related CN Application No. 201380012462.9 dated Apr. 1, 2016.
Unofficial English Translation of Office Action and Search Report issued in connection with related CN Application No. 201380012020.4 dated May 23, 2016.
U.S. Non-Final Office Action issued in connection with Related U.S. Appl. No. 14/382,028 dated Aug. 1, 2016.
Unofficial English Translation of Chinese Office Action issued in connection with Related CN Application No. 201380011941.9 dated Oct. 17, 2016.
Unofficial English Translation of Japanese Office Action issued in connection with Related JP Application No. 2014559240 dated Nov. 8, 2016.
Unofficial English Translation of Japanese Office Action issued in connection with Related JP Application No. 2014559241 dated Nov. 8, 2016.
Unofficial English Translation of Japanese Office Action issued in connection with corresponding JP Application No. 2014559243 dated Nov. 22, 2016.
Unofficial English Translation of Japanese Office Action issued in connection with Related JP Application No. 2014559246 dated Nov. 22, 2016.
Unofficial English Translation of Japanese Search Report issued in connection with Related JP Application No. 2014559240 dated Nov. 30, 2016.
Unofficial English Translation of Japanese Search Report issued in connection with Related JP Application No. 2014559241 dated Nov. 30, 2016.
Unofficial English Translation of Japanese Office Action issued in connection with Related JP Application No. 2014559242 dated Dec. 6, 2016.
Unofficial English Translation of Japanese Office Action issued in connection with Related JP Application No. 2014559245 dated Dec. 6, 2016.
Unofficial English Translation of Japanese Search Report issued in connection with Related JP Application No. 2014559242 dated Dec. 22, 2016.
Unofficial English Translation of Japanese Search Report issued in connection with Related JP Application No. 2014559245 dated Dec. 22, 2016.
Russian Search Report issued in connection with Related RU Application No. 2014133939 dated Dec. 13, 2016.
Russian Search Report issued in connection with Related RU Application No. 2014133935 dated Dec. 14, 2016.
Russian Search Report issued in connection with Related RU Application No. 2014133942 dated Dec. 14, 2016.
Russian Notice of Acceptance issued in connection with Related RU Application No. 2014133935 dated Dec. 29, 2016.
Russian Notice of Acceptance issued in connection with Related RU Application No. 2014133939 dated Dec. 29, 2016.
Unofficial English Translation of Russian Office action issued in connection with Related RU Application No. 2014133941 dated Jan. 12, 2017.
Unofficial English Translation of Japanese Office action issued in connection with Related JP Application No. 2014559227 dated Jan. 24, 2017.
Russian Office action issued in connection with Related RU Application No. 2014134207 dated Jan. 24, 2017.
Unofficial English Translation of Japanese Search Report issued in connection with Related JP Application No. 2014559227 dated Feb. 1, 2017.
U.S. Non-Final Office Action issued in connection with related U.S. Appl. No. 14/382,030 dated Apr. 14, 2017.
U.S. Non-Final Office Action issued in connection with related U.S. Appl. No. 14/382,013 dated May 5, 2017.
Unofficial English Translation of Chinese Notice of Allowance issued in connection with related CN Application No. 201380012462.9 dated Jun. 8, 2017.
U.S. Non-Final Office Action issued in connection with related U.S. Appl. No. 14/382,076 dated Aug. 9, 2017.
U.S. Final Office Action issued in connection with related U.S. Appl. No. 14/382,049 dated Sep. 5, 2017.
U.S. Appl. No. 14/382,028, filed Aug. 29, 2014, David Bianucci.
U.S. Appl. No. 14/382,013, filed Aug. 29, 2014, Alberto Ceccherini.
U.S. Appl. No. 14/382,036, filed Aug. 29, 2014, Mohamed Ali.
U.S. Appl. No. 14/382,049, filed Aug. 29, 2014, Ever Avriel Fadlun.
U.S. Appl. No. 14/382,076, filed Aug. 29, 2014, Nicola Giannini.
U.S. Appl. No. 14/382,030, filed Aug. 29, 2014, Arul Saravanapriyan.
Theilliol et al., "A hierarchical fault diagnosis method using a decision support system applied to a chemical plant", Systems, Man and Cybernetics, Intelligent Systems for the 21st Century, IEEE International Conference on Vancouver, BC, Canada, NY, USA, IEEE, US, vol. No. 3, pp. 2205-2210, Oct. 22, 1995.
Wurzbach, "Infrared Thermography of Fan and Compressor Systems in a Predictive Maintenance Program", Proceedings SPIE, Thermosense XX, vol. No. 3361, Apr. 13, 1998.
Bayley, "Flows and temperatures in compressor and turbine wheel spaces", Proceedings of the Institution of Mechanical Engineers,

(56) References Cited

OTHER PUBLICATIONS

Part C: Journal of Mechanical Engineering Science, vol. No. 213, Issue No. 5, pp. 451-460, May 1, 1999.

Gulen et al., "Real-Time On-Line Performance Diagnostics of Heavy-Duty Industrial Gas Turbines", Journal of Engineering for Gas Turbines and Power, ASME, vol. No. 124, pp. 910-921, Oct. 1, 2002.

Brooks, "GE Gas Turbine Performance Characteristics", GE Power Systems, Oct. 31, 2000.

Davis et al., "Dry Low NOx Combustion Systems for GE Heavy-Duty Gas Turbines", GE Power Systems, Oct. 31, 2000.

Search Report and Written Opinion issued in connection with corresponding IT Application No. CO2012A000008 dated Oct. 22, 2012.

International Search Report and Written Opinion issued in connection with corresponding PCT Application No. PCT/EP2013/054098 dated May 21, 2013.

International Search Report and Written Opinion issued in connection with corresponding PCT Application No. PCT/EP2013/054162 dated Jun. 25, 2013.

International Search Report and Written Opinion issued in connection with corresponding PCT Application No. PCT/EP2013/054158 dated Jul. 1, 2013.

International Search Report and Written Opinion issued in connection with corresponding PCT Application No. PCT/EP2013/054154 dated Jul. 4, 2013.

International Search Report and Written Opinion issued in connection with corresponding PCT Application No. PCT/EP2013/054161 dated Jul. 9, 2013.

International Search Report and Written Opinion issued in connection with corresponding PCT Application No. PCT/EP2013/054157 dated Jul. 19, 2013.

International Search Report and Written Opinion issued in connection with corresponding PCT Application No. PCT/EP2013/054156 dated Jan. 8, 2014.

\* cited by examiner

METHOD AND SYSTEM FOR REAL-TIME PERFORMANCE DEGRADATION ADVISORY FOR CENTRIFUGAL COMPRESSORS

FIELD OF THE INVENTION

This description relates to generally to mechanical/electrical equipment operations, monitoring and diagnostics, and more specifically, to systems and methods for automatically advising operators of anomalous behavior of machinery.

BACKGROUND OF THE INVENTION

Monitoring machinery performance and alerting operators to anomalous conditions that can impact performance is an important part of operating one or a fleet of machines. Relatively simple known monitoring systems lack detailed design information that would permit them to not only monitor centrifugal compressors but also analyze performance degradation online in real-time and recommend trouble-shooting steps required to localize and mitigate the performance degradation. Moreover, current monitoring systems do not typically adjust thresholds based on compressor load or other operating conditions. Using only static thresholds permits false positive alarms. Without this calculation, only static thresholds based on constant deviation from preset values is available. Moreover, rapidly changing operational conditions or very slowly changing operational conditions may make it difficult for an operator to recognize anomalous conditions or what operational changes can be made to mitigate the anomalous conditions.

SUMMARY OF THE INVENTION

In one embodiment, a computer-implemented method for generating real-time performance advisories for a centrifugal compressor of a fleet of centrifugal compressors includes receiving an actual thermodynamic signature of the compressor, that is unique to the compressor, receiving compressor process parameter values during operation of the compressor, determining, in real-time, an actual performance of the compressor using the compressor process parameter values, determining, in real-time, a predicted performance of the compressor using the received actual thermodynamic signature of the compressor, determining a performance deviation of the compressor using the actual performance and the predicted performance, comparing the performance deviation to a predetermined threshold range of performance deviation, and generating a notification to a user using the comparison.

In another embodiment, a compressor monitoring and diagnostic system for a gas turbine including a centrifugal compressor and a low pressure turbine in flow communication wherein the system includes a centrifugal compressor performance rule set, the rule set including a subset of a plurality of actual thermodynamic signatures for a fleet of centrifugal compressors and a relational expression of a real-time data output relative to a real-time data input, where the subset includes an actual thermodynamic signature of the compressor, and the relational expression is specific to a inputs relating to an operational performance of the centrifugal compressor, the rule set is configured to determine a performance deviation of the compressor using an actual performance of the compressor and a predicted performance of the compressor, compare the performance deviation to a predetermined threshold range of performance deviation, and generate a notification to a user using the comparison.

In yet another embodiment, one or more non-transitory computer-readable storage media has computer-executable instructions embodied thereon, wherein when executed by at least one processor, the computer-executable instructions cause the processor to receive compressor process parameter values during operation of the compressor, determine, in real-time, an actual performance of the compressor using the compressor process parameter values, determine, in real-time, a predicted performance of the compressor using the received actual thermodynamic signature of the compressor, determine a performance deviation of the compressor using an actual performance of the compressor and a predicted performance of the compressor, compare the performance deviation to a predetermined threshold range of performance deviation, and generate a notification to a user using the comparison.

BRIEF DESCRIPTION OF THE DRAWINGS

FIG. 1 is a schematic block diagram of a remote monitoring and diagnostic system in accordance with an exemplary embodiment of the present invention;

FIG. 2 is a block diagram of an exemplary embodiment of a network architecture of a local industrial plant monitoring and diagnostic system, such as a distributed control system (DCS);

FIG. 3 is a block diagram of an exemplary rule set that may be used with LMDS shown in FIG. 1;

FIG. 4 is a schematic flow diagram for generating a real-time actual performance calculation for a centrifugal compressor in accordance with an exemplary embodiment of the present disclosure.

FIG. 5 is a schematic flow diagram for generating a real-time expected performance calculation for centrifugal compressor in accordance with an exemplary embodiment of the present disclosure.

FIG. 6 is a screen capture of a performance module screen for the compressor illustrating a visual depiction between actual to expected performance of the compressor.

FIG. 7 is a flow diagram of a method of the compressor performance calculation details.

Figure 1:
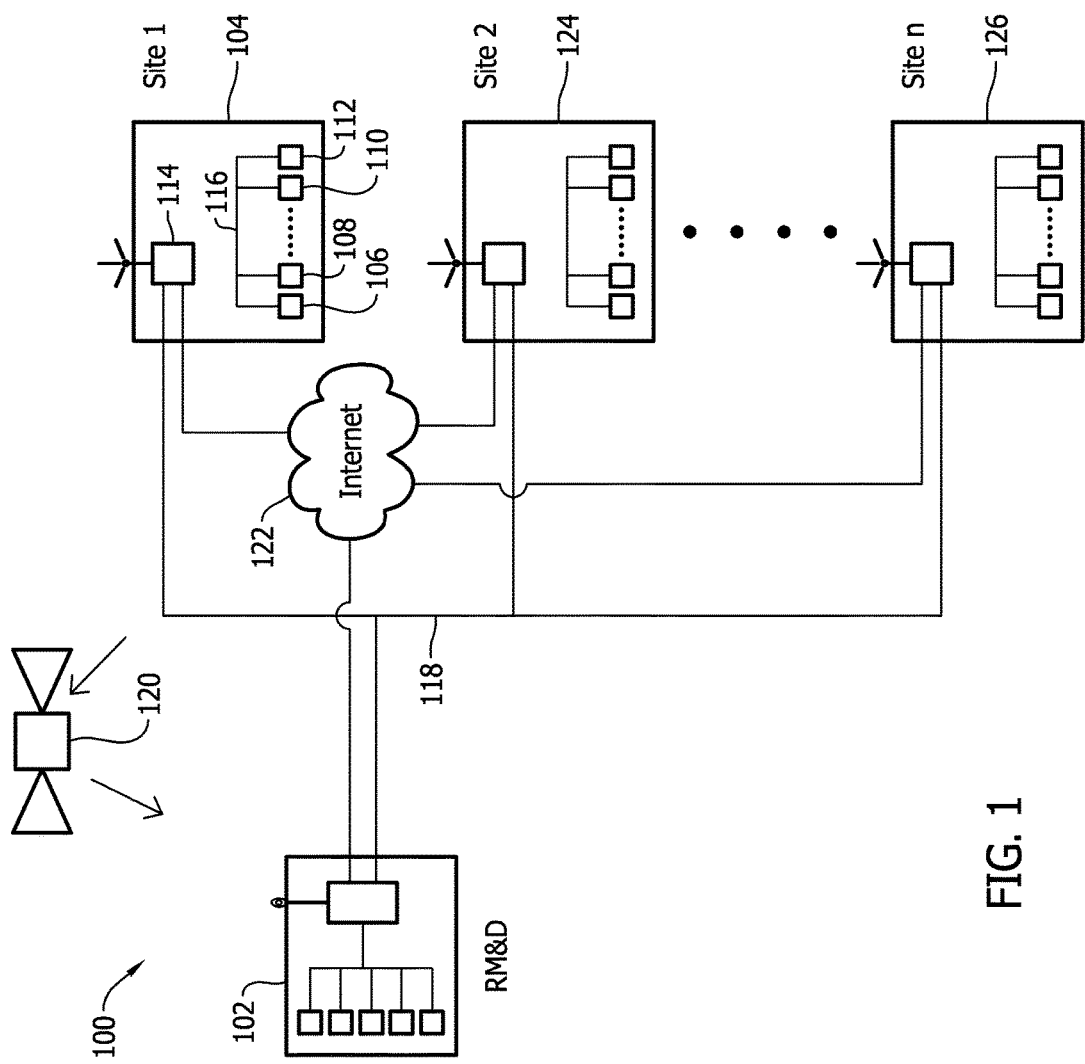
FIGS. 1-7 show exemplary embodiments of the method and system described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE INVENTION

The following detailed description illustrates embodiments of the invention by way of example and not by way of limitation. It is contemplated that the invention has general application to analytical and methodical embodiments of monitoring equipment operation in industrial, commercial, and residential applications.

The centrifugal compressor performance rule set described herein permits operators to know when their machine is not operating as efficiently as possible or as efficiently as it once. Knowing the design criteria, as received from the OEM of the compressor permits accurate real-time performance display for quick assessment of problems and permits detailed assessments of possible sources of the problems. A real-time compressor performance advisory for centrifugal compressors calculates the 'actual' and 'expected' performance of the machine using the OEM design tools in place of existing non-physics based methodologies provides higher calculation accuracies.

The expected and actual performance calculations are carried out at, for example, one minute intervals and any anomalous deviation is notified to a user. The deviation in threshold along with the time persistence of the deviation determines the decision to notify the user.

Based on the severity of the threshold violation, an alarm is generated along with a performance degradation advisory. The performance degradation advisory provides the various actions in steps to be performed to identify the possible sources of the cause.

The calculation methodology used for 'expected performance' permits each compressor operator real-time performance envelopes for each snap shot of data supplied from the monitoring controllers to avoid using only a static performance envelope supplied one-time by the OEM during machine commissioning.

Centrifugal compressors are dynamic machines and highly sensitive to the system resistance and impeller velocities. The system resistance and impeller velocities are governed by the gas composition and operating conditions. Performance of these machines can deteriorate due to poor operating condition or due to flow passage changes (deposition). Accurate performance estimation, their interpretation and providing follow-up action (advisory) still remains a challenging task mainly due to wide variation in operating conditions within OEM envelope and limitation of static baseline or static OEM operating envelope. The methods described herein dynamically generate the compressor baseline or 'expected performance' in real-time at predetermined intervals using monitoring system data. The dynamic OEM envelope is more realistic to the current operating condition as against the static envelope. Also, a methodology is developed to track the deviation in actual performance from the dynamic baseline bearing in mind the varying machine operating conditions. The OEM design tools are used for the estimation of actual and expected performances respectively. The OEM 'As Tested' curves are embedded to perform the calculations.

As used herein, real-time refers to outcomes occurring at a substantially short period after a change in the inputs affecting the outcome, for example, computational calculations and/or element linking The period may be an amount of time between iterations of a regularly repeated task. Such repeated tasks are called periodic tasks. The time period is a design parameter of the real-time system that may be selected based on the importance of the outcome and/or the capability of the system implementing processing of the inputs to generate the outcome. Additionally, events occurring in real-time occur without substantial intentional delay. In the exemplary embodiment, links are updated and mutations are fired in real-time within network and component capabilities.

FIG. 1 is a schematic block diagram of remote monitoring and diagnostic system 100 in accordance with an exemplary embodiment of the present invention. In the exemplary embodiment, system 100 includes a remote monitoring and diagnostic center 102. Remote monitoring and diagnostic center 102 is operated by an entity, such as, an OEM of a plurality of equipment purchased and operated by a separate business entity, such as, an operating entity. In the exemplary embodiment, the OEM and operating entity enter into a support arrangement whereby the OEM provides services related to the purchased equipment to the operating entity. The operating entity may own and operate purchased equipment at a single site or multiple sites. Moreover, the OEM may enter into support arrangements with a plurality of operating entities, each operating their own single site or multiple sites. The multiple sites each may contain identical individual equipment or pluralities of identical sets of equipment, such as trains of equipment. Additionally, at least some of the equipment may be unique to a site or unique to all sites.

In the exemplary embodiment, a first site 104 includes one or more process analyzers 106, equipment monitoring systems 108, equipment local control centers 110, and/or monitoring and alarm panels 112 each configured to interface with respective equipment sensors and control equipment to effect control and operation of the respective equipment. The one or more process analyzers 106, equipment monitoring systems 108, equipment local control centers 110, and/or monitoring and alarm panels 112 are communicatively coupled to an intelligent monitoring and diagnostic system 114 through a network 116. Intelligent monitoring and diagnostic (IMAD) system 114 is further configured to communicate with other on-site systems (not shown in FIG. 1) and offsite systems, such as, but not limited to, remote monitoring and diagnostic center 102. In various embodiments, IMAD 114 is configured to communicate with remote monitoring and diagnostic center 102 using for example, a dedicated network 118, a wireless link 120, and the Internet 122.

Each of a plurality of other sites, for example, a second site 124 and an nth site 126 may be substantially similar to first site 104 although may or may not be exactly similar to first site 104.

Figure 2:
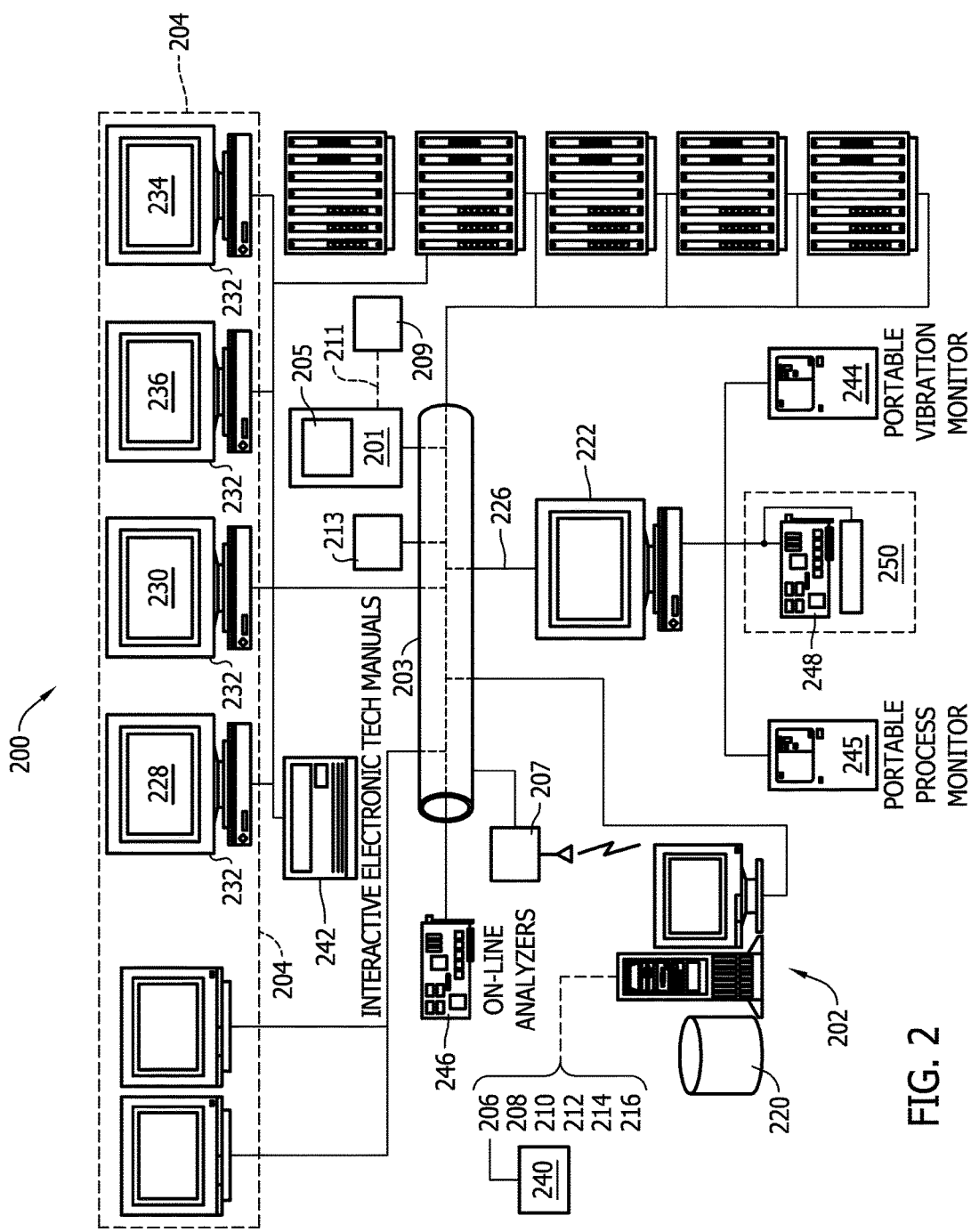

FIG. 2 is a block diagram of an exemplary embodiment of a network architecture 200 of a local industrial plant monitoring and diagnostic system, such as a distributed control system (DCS) 201. The industrial plant may include a plurality of plant equipment, such as gas turbines, centrifugal compressors, gearboxes, generators, pumps, motors, fans, and process monitoring sensors that are coupled in flow communication through interconnecting piping, and coupled in signal communication with DCS 201 through one or more remote input/output (I/O) modules and interconnecting cabling and/or wireless communication. In the exemplary embodiment, the industrial plant includes DCS 201 including a network backbone 203. Network backbone 203 may be a hardwired data communication path fabricated from twisted pair cable, shielded coaxial cable or fiber optic cable, for example, or may be at least partially wireless. DCS 201 may also include a processor 205 that is communicatively coupled to the plant equipment, located at the industrial plant site or at remote locations, through network backbone 203. It is to be understood that any number of machines may be operatively connected to network backbone 203. A portion of the machines may be hardwired to network backbone 203, and another portion of the machines may be wirelessly coupled to backbone 203 via a wireless base station 207 that is communicatively coupled to DCS 201. Wireless base station 207 may be used to expand the effective communication range of DCS 201, such as with equipment or sensors located remotely from the industrial plant but, still interconnected to one or more systems within the industrial plant.

DCS 201 may be configured to receive and display operational parameters associated with a plurality of equipment, and to generate automatic control signals and receive manual control inputs for controlling the operation of the equipment of industrial plant. In the exemplary embodiment, DCS 201 may include a software code segment configured to control processor 205 to analyze data received at DCS 201 that allows for on-line monitoring and diagnosis of the industrial plant machines. Data may be collected from each machine, including gas turbines, centrifugal compressors, pumps and motors, associated process sensors, and local environmental sensors including, for example, vibration, seismic, temperature, pressure, current, voltage, ambient temperature and ambient humidity sensors. The data may be pre-processed by a local diagnostic module or a remote input/output module, or may be transmitted to DCS 201 in raw form.

A local monitoring and diagnostic system (LMDS) 213 may be a separate add-on hardware device, such as, for example, a personal computer (PC), that communicates with DCS 201 and other control systems 209 and data sources through network backbone 203. LMDS 213 may also be embodied in a software program segment executing on DCS 201 and/or one or more of the other control systems 209. Accordingly, LMDS 213 may operate in a distributed manner, such that a portion of the software program segment executes on several processors concurrently. As such, LMDS 213 may be fully integrated into the operation of DCS 201 and other control systems 209. LMDS 213 analyzes data received by DCS 201, data sources, and other control systems 209 to determine an operational health of the machines and/or a process employing the machines using a global view of the industrial plant.

In the exemplary embodiment, network architecture 100 includes a server grade computer 202 and one or more client systems 203. Server grade computer 202 further includes a database server 206, an application server 208, a web server 210, a fax server 212, a directory server 214, and a mail server 216. Each of servers 206, 208, 210, 212, 214, and 216 may be embodied in software executing on server grade computer 202, or any combinations of servers 206, 208, 210, 212, 214, and 216 may be embodied alone or in combination on separate server grade computers coupled in a local area network (LAN) (not shown). A data storage unit 220 is coupled to server grade computer 202. In addition, a workstation 222, such as a system administrator's workstation, a user workstation, and/or a supervisor's workstation are coupled to network backbone 203. Alternatively, workstations 222 are coupled to network backbone 203 using an Internet link 226 or are connected through a wireless connection, such as, through wireless base station 207.

Each workstation 222 may be a personal computer having a web browser. Although the functions performed at the workstations typically are illustrated as being performed at respective workstations 222, such functions can be performed at one of many personal computers coupled to network backbone 203. Workstations 222 are described as being associated with separate exemplary functions only to facilitate an understanding of the different types of functions that can be performed by individuals having access to network backbone 203.

Server grade computer 202 is configured to be communicatively coupled to various individuals, including employees 228 and to third parties, e.g., service providers 230. The communication in the exemplary embodiment is illustrated as being performed using the Internet, however, any other wide area network (WAN) type communication can be utilized in other embodiments, i.e., the systems and processes are not limited to being practiced using the Internet.

In the exemplary embodiment, any authorized individual having a workstation 232 can access LMDS 213. At least one of the client systems may include a manager workstation 234 located at a remote location. Workstations 222 may be embodied on personal computers having a web browser. Also, workstations 222 are configured to communicate with server grade computer 202. Furthermore, fax server 212 communicates with remotely located client systems, including a client system 236 using a telephone link (not shown). Fax server 212 is configured to communicate with other client systems 228, 230, and 234, as well.

Computerized modeling and analysis tools of LMDS 213, as described below in more detail, may be stored in server 202 and can be accessed by a requester at any one of client systems 204. In one embodiment, client systems 204 are computers including a web browser, such that server grade computer 202 is accessible to client systems 204 using the Internet. Client systems 204 are interconnected to the Internet through many interfaces including a network, such as a local area network (LAN) or a wide area network (WAN), dial-in-connections, cable modems and special high-speed ISDN lines. Client systems 204 could be any device capable of interconnecting to the Internet including a web-based phone, personal digital assistant (PDA), or other web-based connectable equipment. Database server 206 is connected to a database 240 containing information about industrial plant 10, as described below in greater detail. In one embodiment, centralized database 240 is stored on server grade computer 202 and can be accessed by potential users at one of client systems 204 by logging onto server grade computer 202 through one of client systems 204. In an alternative embodiment, database 240 is stored remotely from server grade computer 202 and may be non-centralized.

Other industrial plant systems may provide data that is accessible to server grade computer 202 and/or client systems 204 through independent connections to network backbone 204. An interactive electronic tech manual server 242 services requests for machine data relating to a configuration of each machine. Such data may include operational capabilities, such as pump curves, motor horsepower rating, insulation class, and frame size, design parameters, such as dimensions, number of rotor bars or impeller blades, and machinery maintenance history, such as field alterations to the machine, as-found and as-left alignment measurements, and repairs implemented on the machine that do not return the machine to its original design condition.

A portable vibration monitor 244 may be intermittently coupled to LAN directly or through a computer input port such as ports included in workstations 222 or client systems 204. Typically, vibration data is collected in a route, collecting data from a predetermined list of machines on a periodic basis, for example, monthly or other periodicity. Vibration data may also be collected in conjunction with troubleshooting, maintenance, and commissioning activities. Further, vibration data may be collected continuously in a real-time or near real-time basis. Such data may provide a new baseline for algorithms of LMDS 213. Process data may similarly, be collected on a route basis or during troubleshooting, maintenance, and commissioning activities. Moreover, some process data may be collected continuously in a real-time or near real-time basis. Certain process parameters may not be permanently instrumented and a portable process data collector 245 may be used to collect process parameter data that can be downloaded to DCS 201 through workstation 222 so that it is accessible to LMDS 213. Other process parameter data, such as process fluid composition analyzers and pollution emission analyzers may be provided to DCS 201 through a plurality of on-line monitors 246.

Electrical power supplied to various machines or generated by generators with the industrial plant may be monitored by a motor protection relay 248 associated with each machine. Typically, such relays 248 are located remotely from the monitored equipment in a motor control center (MCC) or in switchgear 250 supplying the machine. In addition, to protection relays 248, switchgear 250 may also include a supervisory control and data acquisition system (SCADA) that provides LMDS 213 with power supply or power delivery system (not shown) equipment located at the industrial plant, for example, in a switchyard, or remote transmission line breakers and line parameters.

Figure 3:
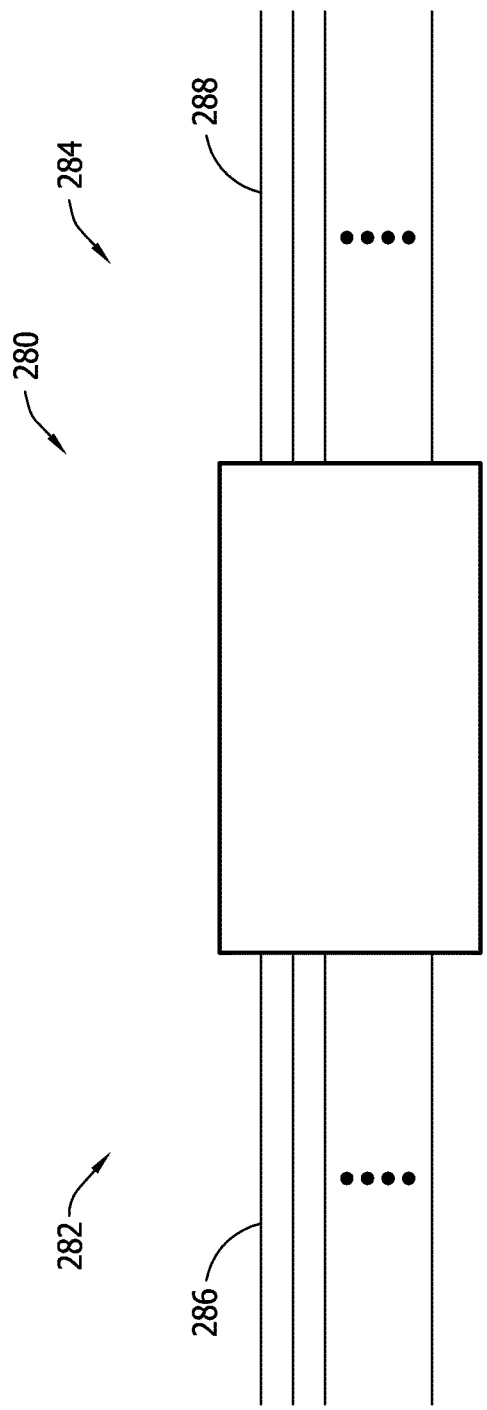

FIG. 3 is a block diagram of an exemplary rule set 280 that may be used with LMDS 213 (shown in FIG. 1). Rule set 280 may be a combination of one or more custom rules, and a series of properties that define the behavior and state of the custom rules. The rules and properties may be bundled and stored in a format of an XML string, which may be encrypted based on a 25 character alphanumeric key when stored to a file. Rule set 280 is a modular knowledge cell that includes one or more inputs 282 and one or more outputs 284. Inputs 282 may be software ports that direct data from specific locations in LMDS 213 to rule set 280. For example, an input from a pump outboard vibration sensor may be transmitted to a hardware input termination in DCS 201. DCS 201 may sample the signal at that termination to receive the signal thereon. The signal may then be processed and stored at a location in a memory accessible and/or integral to DCS 201. A first input 286 of rule set 280 may be mapped to the location in memory such that the contents of the location in memory is available to rule set 280 as an input. Similarly, an output 288 may be mapped to another location in the memory accessible to DCS 201 or to another memory such that the location in memory contains the output 288 of rule set 280.

In the exemplary embodiment, rule set 280 includes one or more rules relating to monitoring and diagnosis of specific problems associated with equipment operating in an industrial plant, such as, for example, a gas reinjection plant, a liquid natural gas (LNG) plant, a power plant, a refinery, and a chemical processing facility. Although rule set 280 is described in terms of being used with an industrial plant, rule set 280 may be appropriately constructed to capture any knowledge and be used for determining solutions in any field. For example, rule set 280 may contain knowledge pertaining to economic behavior, financial activity, weather phenomenon, and design processes. Rule set 280 may then be used to determine solutions to problems in these fields. Rule set 280 includes knowledge from one or many sources, such that the knowledge is transmitted to any system where rule set 280 is applied. Knowledge is captured in the form of rules that relate outputs 284 to inputs 282 such that a specification of inputs 282 and outputs 284 allows rule set 280 to be applied to LMDS 213. Rule set 280 may include only rules specific to a specific plant asset and may be directed to only one possible problem associated with that specific plant asset. For example, rule set 280 may include only rules that are applicable to a motor or a motor/ pump combination. Rule set 280 may only include rules that determine a health of the motor/pump combination using vibration data. Rule set 280 may also include rules that determine the health of the motor/pump combination using a suite of diagnostic tools that include, in addition to vibration analysis techniques, but may also include, for example, performance calculational tools and/or financial calculational tools for the motor/pump combination.

In operation, rule set 280 is created in a software developmental tool that prompts a user for relationships between inputs 282 and outputs 284. Inputs 282 may receive data representing, for example digital signals, analog signals, waveforms, processed signals, manually entered and/or configuration parameters, and outputs from other rule sets. Rules within rule set 280 may include logical rules, numerical algorithms, application of waveform and signal processing techniques, expert system and artificial intelligence algorithms, statistical tools, and any other expression that may relate outputs 284 to inputs 282. Outputs 284 may be mapped to respective locations in the memory that are reserved and configured to receive each output 284. LMDS 213 and DCS 201 may then use the locations in memory to accomplish any monitoring and/or control functions LMDS 213 and DCS 201 may be programmed to perform. The rules of rule set 280 operate independently of LMDS 213 and DCS 201, although inputs 282 may be supplied to rule set 280 and outputs 284 may be supplied to rule set 280, directly or indirectly through intervening devices.

During creation of rule set 280, a human expert in the field divulges knowledge of the field particular to a specific asset using a development tool by programming one or more rules. The rules are created by generating expressions of relationship between outputs 284 and inputs 282 such that no coding of the rules is needed. Operands may be selected from a library of operands, using graphical methods, for example, using drag and drop on a graphical user interface built into the development tool. A graphical representation of an operand may be selected from a library portion of a screen display (not shown) and dragged and dropped into a rule creation portion. Relationships between input 282 and operands are arranged in a logical display fashion and the user is prompted for values, such as, constants, when appropriate based on specific operands and specific ones of inputs 282 that are selected. As many rules that are needed to capture the knowledge of the expert are created. Accordingly, rule set 280 may include a robust set of diagnostic and/or monitoring rules or a relatively less robust set of diagnostic and/or monitoring rules based on a customer's requirements and a state of the art in the particular field of rule set 280. The development tool provides resources for testing rule set 280 during the development to ensure various combinations and values of inputs 282 produce expected outputs at outputs 284.

Figure 4:
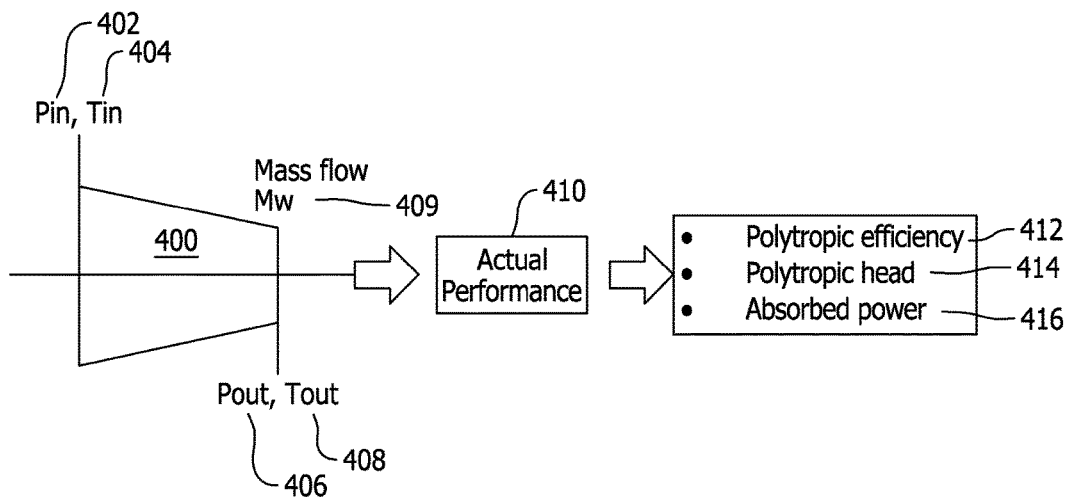

FIG. 4 is a schematic flow diagram for generating a real-time actual performance calculation for a centrifugal compressor 400 in accordance with an exemplary embodiment of the present disclosure. In the exemplary embodiment, compressor process parameter values are acquired from for example, a plant monitoring system that acquires process data from a plurality of components throughout the plant or a compressor monitoring system (neither shown in FIG. 4) that acquires data associated with only compressor 400. In various embodiments, the compressor process parameter values include compressor suction process parameter values and compressor discharge process parameter values. The compressor suction process parameter values include, but are not limited to, a suction pressure $[P_{in}]$ 402 and a suction temperature $[T_{in}]$ 404. The compressor discharge process parameter values include, but are not limited to, a discharge pressure $[P_{out}]$ 406 and a discharge temperature $[T_{out}]$ 408. A mass flow 409 through compressor 400, gas composition and gas molecular weight $[M_W]$ and shaft rotating speed [rpm] are also acquired.

The compressor process parameter values are applied to a polytrophic thermodynamic algorithm 410 using a more complete set of thermodynamic transformation and, more important, real gas behavior based on several equations of state to determine the actual performance of compressor 400. Moreover, polytrophic thermodynamic algorithm 410 and the compressor process parameter values are used to calculate a polytropic efficiency 412, a polytropic head 414, and an absorbed power 416 for compressor 400.

Figure 5:
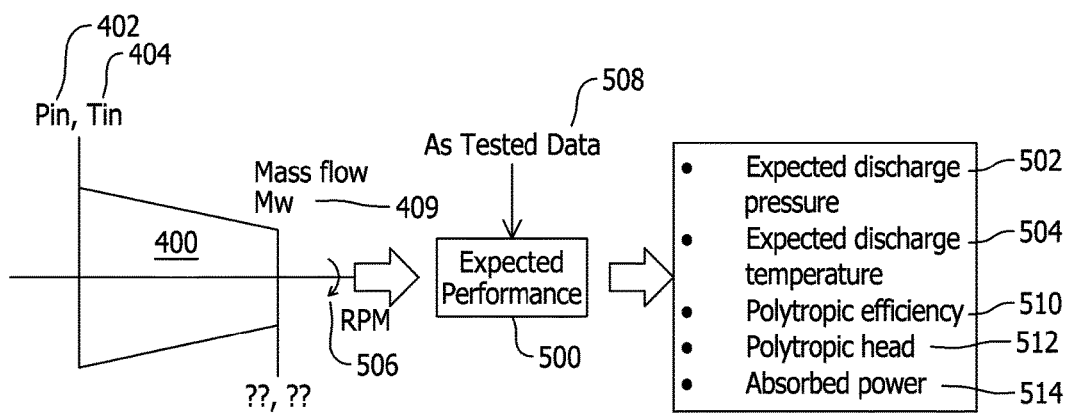

FIG. 5 is a schematic flow diagram for generating a real-time expected performance calculation for centrifugal compressor 400 in accordance with an exemplary embodiment of the present disclosure. In the exemplary embodiment, compressor process parameter values are acquired from the plant monitoring system or the compressor monitoring system (neither shown in FIG. 4). In various embodiments, the compressor process parameter values include compressor suction process parameter values. The compressor suction process parameter values include, but are not limited to, a suction pressure $[P_{in}]$ 402 and a suction temperature $[T_{in}]$ 404. The compressor discharge process parameter values are values to be solved for by a compressor performance rule set 500. The compressor discharge process parameter values to be solved for include, but are not limited to, an expected discharge pressure 502 and an expected discharge temperature 504.

The compressor process parameter values and as-tested data 508 are applied to compressor performance rule set 500 to determine the expected performance of compressor 400. Moreover, compressor performance rule set 500 and the compressor process parameter values are used to calculate expected discharge pressure 502, expected discharge temperature 504, a polytropic efficiency 510, a polytropic head 512, and an absorbed power 514 for compressor 400.

Figure 6:
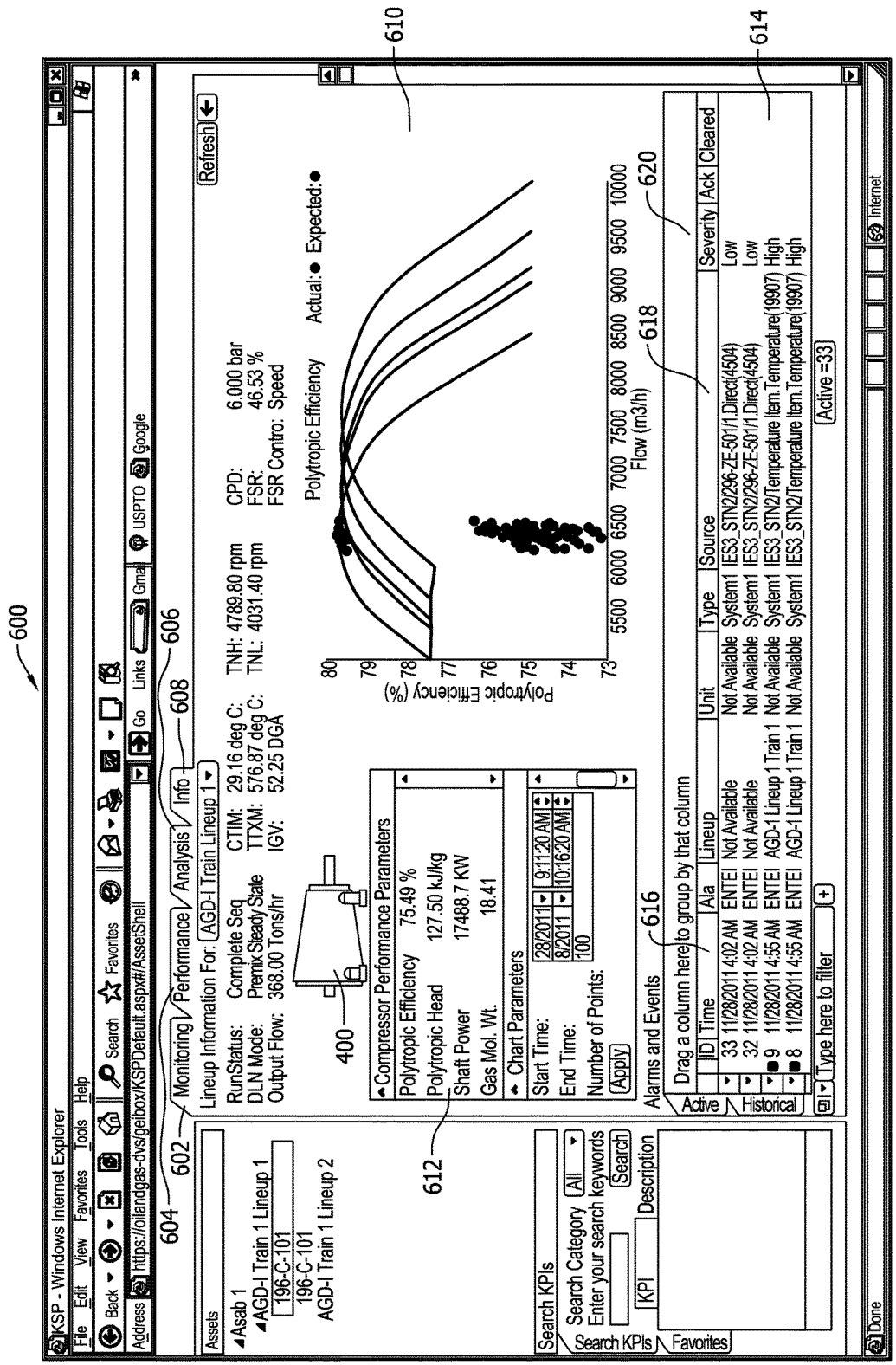

FIG. 6 is a screen capture of a performance module screen 600 for compressor 400 illustrating a visual depiction between actual to expected performance of compressor 400. Analysis of compressor 400 performed by compressor performance rule set 500 is displayed on a plurality of selectable tabs of performance module screen 600. For example, a monitoring tab 602, a performance tab 604 (selected in FIG. 6), an analysis tab 606, and an information tab 608. Performance module screen 600 includes a graph area 610 where graphical information is displayed, a performance parameter value area 612, and an event and alarms area 614 for displaying information to a user, including a timestamp 616, a source 618, and a severity level 620.

Figure 7:
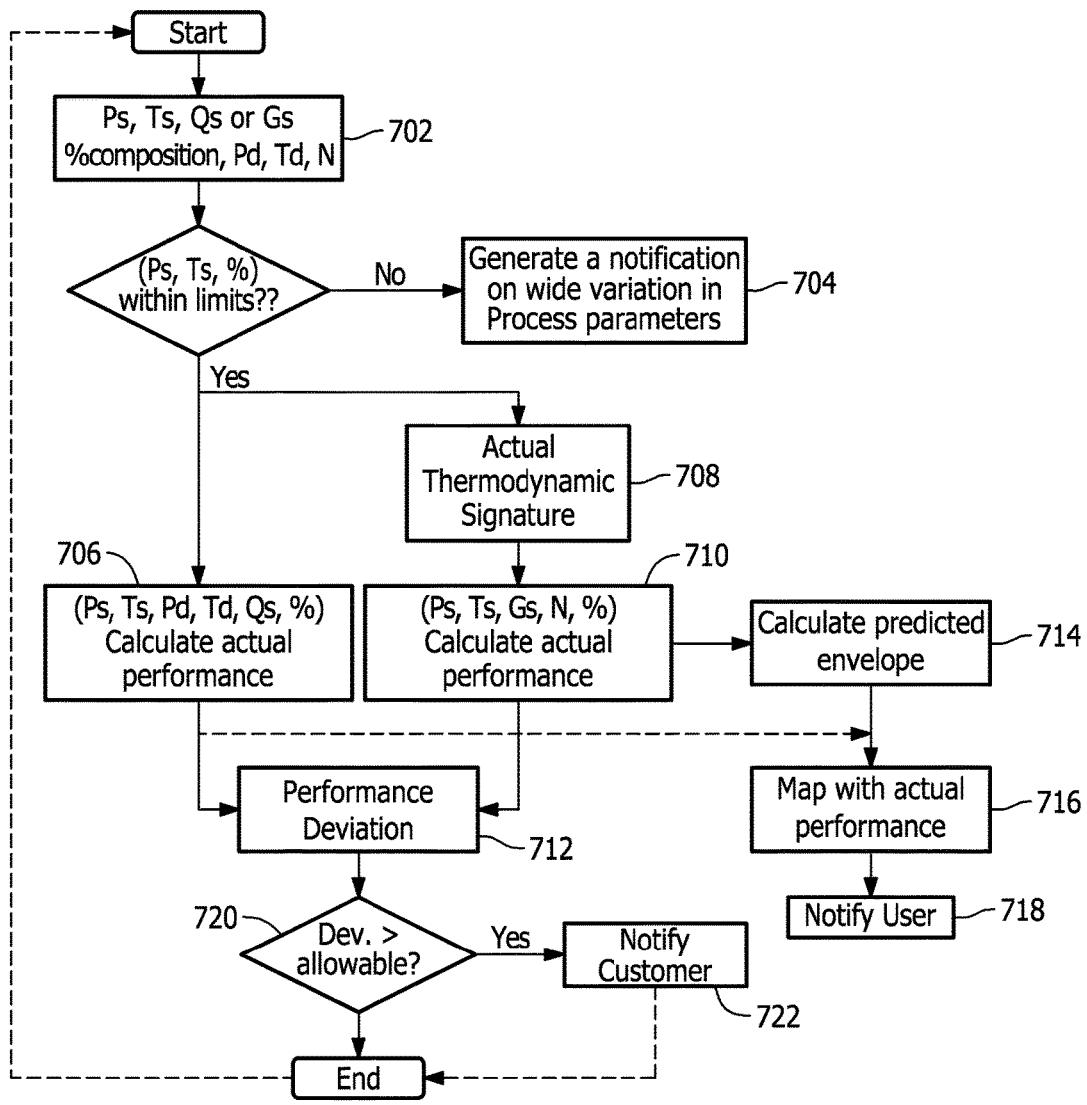

FIG. 7 is a flow diagram of a method 700 of compressor performance calculation details. In the exemplary embodiment, method 700 is a computer-implemented method for generating real-time performance advisories for a centrifugal compressor of a fleet of centrifugal compressors, method 700 is implemented using a computer device coupled to a user interface and a memory device. Method 700 includes receiving 702 compressor process parameter values during operation of the compressor. The on-line controller data such as inlet pressure/temperature, mass flow, gas composition, exit pressure/temperature and shaft speed is supplied to compressor performance rule set 500 at for example, an every minute interval. Method 700 includes generating 704 a variation notification if suction process parameter values of the received compressor process parameter values exceed a predetermined range. If the received compressor process parameter values meet the predetermined range, method 700 includes determining 706, in real-time, an actual performance of the compressor using a polytrophic thermodynamic algorithm and the received inlet pressure/temperature, mass flow, gas composition, exit pressure/temperature and shaft speed. Method 700 also includes receiving 708 an actual thermodynamic signature of the compressor, that is unique to the compressor from the manufacturer of the compressor and which is a subset of a plurality of actual thermodynamic signatures for the fleet of centrifugal compressors, and determining 710, in real-time, a predicted performance of the compressor using the actual thermodynamic signature of the compressor and using a more complete set of thermodynamic transformation and real gas behavior based on several equations of state. A performance deviation of the compressor is determined 712 using the actual performance and the predicted performance and the performance deviation is compared to a predetermined threshold range of performance deviation, and a severity of the performance deviation is determined 720 based on a degradation of compressor performance and a difficulty of mitigating the degradation. A notification to the user is generated 722 based on the determined severity. In various embodiments, the notification includes correlating the performance deviation and the received compressor process parameter values to generate an advisory guiding the user with steps to identify the possible sources of a failure causing the deviation.

Moreover, method 700 also includes determining one or more key performance indicators (KPI) for the operation of the compressor using the thermodynamic signature specific to the compressor and comparing the one or more KPIs to the actual performance to generate one or more KPI performance deviations associated with the one or more KPIs. A notification to the user is generated regarding each KPI performance deviation that exceeds a predetermined KPI performance deviation threshold range. Further, in various embodiments, determining 706 the actual performance of the compressor and determining 710 the predicted performance of the compressor are corrected based on a load on the compressor.

Method 700 also includes determining 714, in real-time, a predicted envelope of the compressor using the determined actual thermodynamic signature of the compressor, generating 716 a performance map using the predicted envelope and the actual performance, and outputting 718 an advisory message based on the generated performance map.

Compressor performance rule set 500 provides high accuracy OEM tools to calculate the realistic expected performance in real-time, performance deviation alarms that considering the wide variation in operational conditions, and actionable alarm advisories and performance advisories based on the nature/degree of the deviation.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

While the disclosure has been described in terms of various specific embodiments, it will be recognized that the disclosure can be practiced with modification within the spirit and scope of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect includes (a) receiving an actual thermodynamic signature of the compressor, that is unique to the compressor, (b) receiving compressor process parameter values during operation of the compressor, (c) determining, in real-time, an actual performance of the compressor using the compressor process parameter values, (d) determining, in real-time, a predicted performance of the compressor using the determined actual thermodynamic signature of the compressor, (e) determining a performance deviation of the compressor using the actual performance and the predicted performance, (f) comparing the performance deviation to a predetermined threshold range of performance deviation (g) generating a notification to a user using the comparison, (h) determining one or more key performance indicators (KPI) for the operation of the compressor using the thermodynamic signature specific to the compressor, (i) comparing the one or more KPIs to the actual performance to generate one or more KPI performance deviations associated with the one or more KPIs, (j) generating a notification to a user regarding each KPI performance deviation that exceeds a predetermined KPI performance deviation threshold range, (k) determining the actual performance and the predicted performance corrected based on a load on the compressor, (l) receiving the actual thermodynamic signature of the compressor from the manufacturer of the compressor, (m) receiving a subset of a plurality of actual thermodynamic signatures for the fleet of centrifugal compressors, (n) receiving compressor suction process parameter values in real-time during operation of the compressor, (o) receiving compressor discharge process parameter values in real-time during operation of the compressor, (p) determining, in real-time, a predicted envelope of the compressor using the determined actual thermodynamic signature of the compressor, (q) generating a performance map using the predicted envelope and the actual performance, (r) outputting an advisory message based on the generated performance map, (s) determining a severity of the performance deviation based on a degradation of compressor performance and a difficulty of mitigating the degradation, (t) generating a notification to a user based on the determined severity, (u) correlating the performance deviation and the received compressor process parameter values to generate an advisory guiding the user with steps to identify the possible sources of a failure causing the deviation, (v) generating a variation notification if suction process parameter values of the received compressor process parameter values exceed a predetermined range, (w) determining the actual performance of the compressor using a polytrophic thermodynamic algorithm and the compressor process parameter values. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and real-time centrifugal compressor performance degradation advisory system that includes a rule module provides a cost-effective and reliable means for providing meaningful operational recommendations and troubleshooting actions. Moreover, the system is more accurate and less prone to false alarms. More specifically, the methods and systems described herein can predict component failure at a much earlier stage than known systems to facilitate significantly reducing outage time and preventing trips. In addition, the above-described methods and systems facilitate predicting anomalies at an early stage enabling site personnel to prepare and plan for a shutdown of the equipment. As a result, the methods and systems described herein facilitate operating gas turbines and other equipment in a cost-effective and reliable manner.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for generating real-time performance advisories for a centrifugal compressor of a fleet of centrifugal compressors, the method implemented using a computer device coupled to a user interface and a memory device, the method comprising:

receiving, by a processor associated with the computer device, an actual thermodynamic signature of the centrifugal compressor, that is unique to the centrifugal compressor;

receiving, by the processor associated with the computer device, centrifugal compressor process parameter values during operation of the centrifugal compressor;

determining, by the processor associated with the computer device, in real-time, an actual performance of the centrifugal compressor using the centrifugal compressor process parameter values and a polytrophic thermodynamic algorithm;

determining, by the processor associated with the computer device, in real-time, a predicted performance of the centrifugal compressor using the received actual thermodynamic signature of the centrifugal compressor and a set of thermodynamic transformation-real gas behavior based equations of state;

determining, by the processor associated with the computer device, a performance deviation of the centrifugal compressor using the actual performance of the centrifugal compressor and the predicted performance of the centrifugal compressor;

comparing, by the processor associated with the computer device, the performance deviation of the centrifugal compressor to a predetermined threshold range of performance deviation;

determining, by the processor associated with the computer device, a severity of the performance deviation of the centrifugal compressor based on a degradation of centrifugal compressor performance and a difficulty of mitigating the degradation; and generating and sending, by the processor associated with the computer device, a notification to a user, based on the determined severity, wherein the notification to the user includes advisory steps to identify sources of a failure that is causing the performance deviation of the centrifugal compressor.

2. The method of claim 1, wherein receiving the actual thermodynamic signature of the centrifugal compressor comprises determining one or more key performance indicators (KPI) for the operation of the centrifugal compressor using the thermodynamic signature specific to the centrifugal compressor.

3. The method of claim 2, further comprising comparing the one or more KPIs to the actual performance to generate one or more KPI performance deviations associated with the one or more KPIs.

4. The method of claim 2, wherein generating the notification to the user, based on the determined severity comprises generating and sending the notification to the user regarding each KPI performance deviation that exceeds a predetermined KPI performance deviation threshold range.

5. The method of claim 1, wherein determining the actual performance of the centrifugal compressor and determining the predicted performance of the centrifugal compressor comprises determining the actual performance of the centrifugal compressor and the predicted performance of the centrifugal compressor corrected based on a load on the centrifugal compressor.

6. The method of claim 1, wherein receiving the actual thermodynamic signature of the centrifugal compressor comprises receiving the actual thermodynamic signature of the centrifugal compressor from a manufacturer of the centrifugal compressor.

7. The method of claim 1, wherein receiving the actual thermodynamic signature of the centrifugal compressor comprises receiving a subset of a plurality of actual thermodynamic signatures for the fleet of centrifugal compressors.

8. The method of claim 1, wherein receiving centrifugal compressor process parameter values during operation of the centrifugal compressor comprises:

receiving, by the processor associated with the computer device, centrifugal compressor suction process parameter values in real-time during operation of the centrifugal compressor; and receiving, by the processor associated with the computer device, centrifugal compressor discharge process parameter values in real-time during operation of the centrifugal compressor.

9. The method of claim 1, further comprising:

determining, in real-time, a dynamic predicted OEM envelope of the centrifugal compressor using the received actual thermodynamic signature of the centrifugal compressor and the measured process parameters.

10. The method of claim 1, wherein comparing the performance deviation of the centrifugal compressor to the predetermined threshold range of performance deviation comprises:
  determining, by the processor associated with the computer device, a severity of the performance deviation of the centrifugal compressor based on a degradation of centrifugal compressor performance and a difficulty of mitigating the degradation; and
  generating and sending, by a processor associated with the computer device, the notification to the user, based on the determined severity, wherein the notification to the user includes correlating the performance deviation of the centrifugal compressor and the received centrifugal compressor process parameter values.

11. A system for generating real-time performance advisories for a centrifugal compressor of a fleet of centrifugal compressors, the system comprising:
  a memory device;
  an user interface; and
  a processor configured to:
    receive an actual thermodynamic signature of the centrifugal compressor, that is unique to the centrifugal compressor;
    receive centrifugal compressor process parameter values during operation of the centrifugal compressor;
    determine, in real-time, an actual performance of the centrifugal compressor using the centrifugal compressor process parameter values and a polytrophic thermodynamic algorithm;
    determine, in real-time, a predicted performance of the centrifugal compressor using the received actual thermodynamic signature of the centrifugal compressor and a set of thermodynamic transformation-real gas behavior based equations of state;
    determine a performance deviation of the centrifugal compressor using the actual performance of the centrifugal compressor and the predicted performance of the centrifugal compressor;
    compare the performance deviation of the centrifugal compressor to a predetermined threshold range of performance deviation;
    determine, a severity of the performance deviation of the centrifugal compressor based on a degradation of centrifugal compressor performance and a difficulty of mitigating the degradation; and
    generate and send a notification to a user associated with the user interface based on the determined severity, wherein the notification to the user associated with the user interface includes advisory steps to identify sources of a failure that is causing the performance deviation of the centrifugal compressor.

12. The system of claim 11, wherein receiving the actual thermodynamic signature of the centrifugal compressor comprises determining one or more key performance indicators (KPI) for the operation of the centrifugal compressor using the thermodynamic signature specific to the centrifugal compressor.

13. The system of claim 12, wherein the process is further configured to compare the one or more KPIs to the actual performance to generate one or more KPI performance deviations associated with the one or more KPIs.

14. The system of claim 12, wherein generating and sending the notification to the user interface, based on the determined severity comprises generating and sending the notification to the user interface regarding each KPI performance deviation that exceeds a predetermined KPI performance deviation threshold range.

15. The system of claim 11, wherein determining the actual performance of the centrifugal compressor and determining the predicted performance of the centrifugal compressor comprises determining the actual performance and the predicted performance corrected based on a load on the centrifugal compressor.

16. The system of claim 11, wherein receiving the actual thermodynamic signature of the centrifugal compressor comprises receiving the actual thermodynamic signature of the centrifugal compressor from a manufacturer of the centrifugal compressor.

17. The system of claim 11, wherein receiving the actual thermodynamic signature of the centrifugal compressor comprises receiving a subset of a plurality of actual thermodynamic signatures for the fleet of centrifugal compressors.

18. The system of claim 11, wherein receiving compressor process parameter values during operation of the centrifugal compressor comprises:
  receiving centrifugal compressor suction process parameter values in real-time during operation of the centrifugal compressor; and
  receiving centrifugal compressor discharge process parameter values in real-time during operation of the centrifugal compressor.

19. The system of claim 11, wherein the process is further configured to determine, in real-time, a dynamic predicted envelope of the centrifugal compressor using the received actual thermodynamic signature of the centrifugal compressor and the measured process parameters.

20. The system of claim 11, wherein comparing the performance deviation of the centrifugal compressor to a predetermined threshold range of performance deviation comprises:
  determining the severity of the performance deviation based on a degradation of compressor performance and a difficulty of mitigating the degradation; and
  generating and sending the notification to the user associated with the user interface based on the determined severity, wherein the notification to the user associated with the user interface includes correlating the performance deviation of the centrifugal compressor and the received centrifugal compressor process parameter values.

* * * * *